United States Patent [19]

Hawthorne

[11] 3,976,728

[45] Aug. 24, 1976

[54] REFRACTORY HEAT INSULATING MATERIALS

[75] Inventor: Peter Frederick Hawthorne, Birmingham, England

[73] Assignee: Foseco International Limited, Birmingham, England

[22] Filed: Apr. 24, 1975

[21] Appl. No.: 571,489

Related U.S. Application Data

[63] Continuation of Ser. No. 339,830, March 9, 1973, abandoned.

[30] Foreign Application Priority Data

Mar. 10, 1972 United Kingdom............... 11362/72
June 7, 1972 United Kingdom............... 26655/72

[52] U.S. Cl. .................................... 264/26; 264/87; 264/128; 264/129; 427/45; 427/379
[51] Int. Cl.² ................... C04B 43/02; C04B 43/04
[58] Field of Search .................. 264/25, 26, 30, 87, 264/134, 135, 136, 137, 129, 128; 427/45, 379

[56] References Cited
UNITED STATES PATENTS

| | | | |
|---|---|---|---|
| 2,865,790 | 12/1958 | Baer................................ | 264/26 X |
| 3,233,697 | 2/1966 | Stayter............................. | 264/62 |
| 3,649,406 | 3/1972 | McNish............................ | 264/87 X |
| 3,692,497 | 9/1972 | Keith................................ | 23/288 F |

FOREIGN PATENTS OR APPLICATIONS

649,106 1/1951 United Kingdom................... 264/56

*Primary Examiner*—Robert F. White
*Assistant Examiner*—Thomas P. Pavelko
*Attorney, Agent, or Firm*—Cushman, Darby & Cushman

[57] ABSTRACT

A shaped article of refractory heat insulating material is made by forming a mixture of inorganic refractory fibrous material and a binding agent which may be soluble or dispersible in a suitable liquid medium, forming the mixture to the desired shape, drying the shape in a first drying step, impregnating the so-dried shape in a second drying step, one of the drying steps being an homogeneous drying step and the other being a non-homogeneous drying step.

11 Claims, 1 Drawing Figure

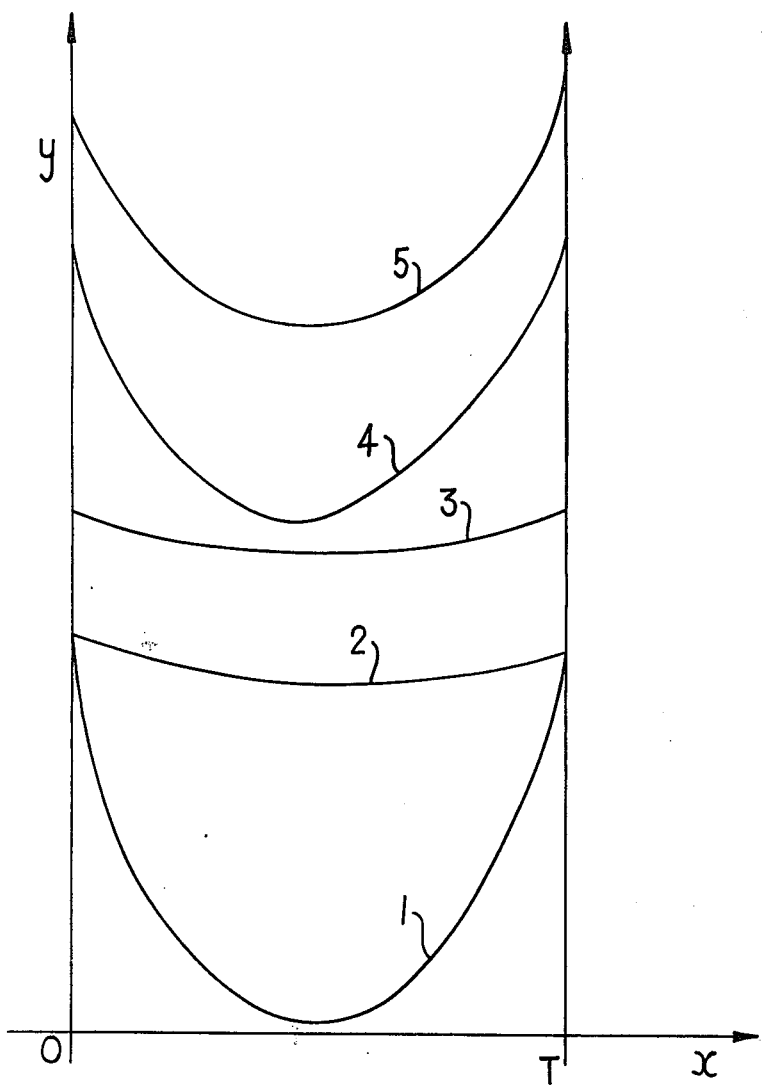

REFRACTORY HEAT INSULATING MATERIALS

This is a continuation of application Ser. No. 339,830 filed Mar. 9, 1973.

This invention relates to refractory heat insulating materials.

There are many instances in technology where refractory heat insulating materials are used. A particular area of use is the protection of metal members, specialist components and casings in combustion engines, particularly gas turbine engines. While the present invention is concerned with the production of refractory heat insulating materials which are specifically of value for such purposes, it is to be understood that the materials may be used for a very wide range of applications of a generally analogous nature.

Numerous methods of making refractory heat insulating materials have been described in the literature. Many of these methods suffer from the disadvantage that, in the manufactured products, mechanical properties are obtained which prevent the products being suitable in use for the protection of metal members specified above since the mechanical properties vary when measured near to the formed surface of the material, from those measured at a point remote from the surface. Thus, for example, many refractory heat insulating materials are formed with fairly strong skins but relatively weak interiors. In some cases, this can be a severe disadvantage since the refractory heat insulating material may tend to split or spall during use.

British Patent No. 1,264,022 describes a method of producing refractory heat insulating materials which have homogeneous properties. We have now found that shaped articles of refractory heat insulating materials of improved properties compared to those described in the specification noted above can be obtained by the use of a particular manufacturing method.

According to the present invention there is provided a method of making a shaped article of refractory heat insulating material which comprises forming a mixture of inorganic refractory fibrous material and a binding agent which may be soluble or dispersible in a suitable liquid medium, forming the mixture to the desired shape, drying the shape in a first drying step, impregnating the so dried shape with binding agent, and drying the shape in a second drying step, one of the drying steps being an homogeneous drying step (as hereinafter defined) and the other being a non-homogeneous drying step (as hereinafter defined).

By the term "homogeneous drying step" we mean one which, when applied to a homogeneous mixture of wet fibre and binder gives a dry product of homogeneous mechanical properties. Examples of such drying steps are microwave drying and dielectric heating.

By the term "non-homogeneous drying step" we mean a drying step which, when applied to an homogeneous wet mixture of fibre and binder, gives a dried product the mechanical properties of which are not homogeneous. The normal form of non-homogenity is that the exterior surface of the dried product are harder, stronger and of greater density than the material remote from the surfaces. An example of such a drying method is hot air oven drying.

The method of the present invention gives the possibility of making articles of refractory heat insulating material having highly advantageous properties and suitable for use, e.g. as gas turbinecasing linings. The basic structure of the shaped article is homogeneous due to the homogeneous drying step, while overlaid on this is an international non-homogenity, the result of the non-homogeneous drying step, which gives the shaped articles improved surface strength, hardness and density. A particularly meaningful measurement for determining the character and quality of refractory heat insulating materials produced according to the present invention is the delamination strength. The delamination strength is regarded as a critical property from a practical point of view and represents the force per unit area required to pull apart a slab of material. In this connection we have found that for the purposes of ensuring that articles produced according to the present invention are of good quality that they should withstand a minimum delamination strength of 2 lbs /sq.in. More preferably they should be able to withstand a delamination strength of 31 lbs /sq.in. The materials are distinguished by their reduced liability to spall in use. The homogeneous and non-homogeneous drying steps may be carried out in either order, and if desired, more than one of each such step may be carried out. Generally, it is only necessary to use two drying steps to produce satisfactory products for a wide variety of applications, but when only two steps are used, it is found preferable that the homogeneous drying step is effected first.

If desired, the volume stability of the articles produced by the method noted as above may be further improved by drying at a temperature between 300° – 900° C. for ½ – 24 hours.

The ingredients of the mixture and the conditions of drying may be selected to give an article having a final density between 0.3 and 0.9 gm/cm$^3$.

The advantages of the present invention may clearly be seen from the general illustration in the accompanying drawing. This drawing shows a generalised graph of properties of the refractory heat insulating material, at various points across the thickness of the article in question, for example, penetration hardness, strength and density. The drawing may be used to illustrate the density profile of the article wherein the density is plotted along the Y axis and the position of measurement across the thickness O-T is plotted along the X axis.

However, we have found that the general shape of the various curves shown is the same for other properties of the materials.

Referring to the drawing, curve 1 is a typical curve for a mixture of refractory fibre and binder dried by a conventional non-homogeneous drying step such as oven drying. Curve 2 is for the same material but dried by microwave drying. Curve 3 is typical for a material which has been dried once by microwave drying, re-impregnated with binder and dried a second time by microwave drying. Curve 4 is typical of a material produced according to the method of the present invention using two drying steps, the non-homogeneous drying step being effected first, and curve 5 the same as curve 4 but with the homogeneous drying step being effected first. The effect of drying at between 300°–900°C would be to raise both curves 4 and 5.

The materials used for the manufacture of shapes of refractory heat insulating material according to the method of this invention may be selected from a wide variety of materials known per se. Thus, for example, the refractory fibrous material may be selected from alumino silicate fibre, calcium silicate fibre, asbestos and alumina, silica, zirconia, boron nitride, silicon carbide, or carbon fibres. Metal fibres especially stainless steel or Nimonic alloy fibre may also be used. A single fibre type may be used or a composite mixture of two or more fibre types may be used.

The binding agent may be, for example, colloidal silica or aluminasol, alkali metal silicate such as sodium and potassium silicate, ethyl silicate or a metallic phosphate or borate. If desired, mixtures of binders can be used and the binder with which the dried shape is impregnated before being subjected to the second drying step need not be the same as the original binder used in the manufacture of the shape. The mixture may also contain a proportion of a refractory filler, such as alumina or silica, preferably a lightweight refractory filler such as finely divided alumina, silica, microspheres, kieselguhr or the like. A particularly preferred lightweight refractory filler is calcined rice husks. Other refractory fillers such as silicon carbide, silicon nitride, fireclay and refractory silicates of various types may also be included.

The relative proportions of the ingredients in the mixture may be varied widely, but will generally be within the following ranges, by weight of the dry material:

| Refractory fibre | 25 – 60% |
|---|---|
| Binder | 40 – 70% |
| Refractory filler | 0 – 40% |

A particular class of materials of value for use in the present invention are mixtures of alumino silicate fibre and colloidal silica sol, preferably in such proportions as to give a final composition after the two drying steps in the range of 55 – 95% by weight silica, remainder alumino silicate fibre. Such material may optionally contain up to 10% by weight calcined rice husks.

As noted above, the invention is of particular value in the production of shaped linings of refractory heat insulating material for use in gas turbine and light engines.

The present invention includes not only the method described above, but the articles obtained thereby and metal articles protected by such shaped articles of refractory heat insulating material.

The following Examples will serve to illustrate the method of the present invention and its use in the manufacture of turbine casing liners.

In all the following Examples the sample test pieces were produced from an aqueous slurry comprising alumino silicate fibre and colloidal silica sol. Each sample being produced from a slurry of 70 gms. of fibre and 3.4 Kg of silica sol binder which contained 7.5% by weight of silica sol in water.

The slurry was dewatered to give a "green" compact measuring 4.5 inches × 4.5 inches × 1 inch. The apparatus consisted basically of a slurry reservoir, a metal mesh filter and a vacuum chamber. The reservoir was filled with slurry and a vacuum of 10 inches of mercury applied. This caused the fibre to be deposited on the mesh filter in layers parallel thereto, the excess binder solution was drawn through the filter into the vacuum chamber.

Of the green compacts prepared as above those disclosed in Example I were dried once using a microwave radiation oven having a frequency of 2450 MHz and Power of 2.5 Kw followed by redipping in a 7.5% by weight silica sol in water solution and subsequently drying in a gas fired oven operating at 180°C.

The compacts tested under Example II were first dried in the gas oven, redipped in the silica sol solution and dried in a microwave oven.

Some of each of the samples dried in accordance with the above were later subjected to heat-treatment by exposure to 400°C for approximately 1 hour.

The delamination strength of all the specimens was then measured on a tensile load testing apparatus called the Hounsfield Tensometer Prior to testing each of the specimens were reduced to 3 × 3 × 1 inch thick by cutting ¾ inch away from each side of the 4.5 × 4.5 × 1 inch slab. The specimens were mounted between 4 × 4 × 0.25 inch aluminium plates using a hot melt adhesive to bind the specimens to both plates. A tensile load was applied at a rate of approximately 5 pounds per second, to the specimen, and the load required to part the specimen was recorded.

The delamination strength was measured according to the formula:

Delamination strength = $W/l \times b$ pounds per square inch where $l$ is the measured length in inches, $b$ is the measured breadth in inches, and $W$ is the load in pounds required to part the specimen.

EXAMPLE I

Samples dried using microwaves re-dipped in colloidal silica sol and re-dried in the gas-fired oven at 180°C.
Average delamination strength — 8.95 pounds/sq.in.
Number of samples determined — 4

EXAMPLE II

Samples dried conventionally re-dipped and followed by drying in a microwave oven.
Average delamination strength — 6.4 pounds /sq.in.
Number of samples determined — 4

EXAMPLE III

Samples produced according to Example I but given a heat treatment at 400°C for 1 hour.
Average delamination strength — 12.0 pounds /sq.in.
Number of samples determined — 4

EXAMPLE IV

Samples produced according to Example II but given heat treatment at 400°C for 1 hour.
Average delamination strength — 10.1 pounds /sq.in.
Number of samples determined — 4

The above results in Examples I – IV indicate a considerable increase in delamination strength over samples tested which had been dried only by conventional oven drying or only by microwave oven drying.

Furthermore, it is apparent that the step of heat treating the samples dried according to the present invention increases their strength by a significant further amount although we do not wish to be bound by any theory as to why this phenomenon should be the case.

I claim:

1. A method of making a shaped article of refractory heat insulating material which comprises forming a homogeneous wet mixture of inorganic refractory fibrous material and binding agent which may be soluble or dispersible in a suitable liquid medium, forming the mixture to the desired shape, drying the shape in a first drying step, impregnating the so-dried shape with binding agent, and drying the shape in a second drying step, one of the drying steps being a drying step which when applied to a homogeneous wet mixture of said fibre and said binder gives a dry product having mechanical properties which are homogeneous between opposed surfaces of the product and the other being a drying step which, when applied to a homogeneous wet mixture of said fibre and said binder, gives a dried product the mechanical properties of which are not homogeneous between opposed surfaces of the product.

2. A method as in claim 1 wherein the homogeneous drying step is carried out by microwave heating or dielectric heating and wherein said non-homogeneous drying step is carried out by heating the article with hot air.

3. A method according to claim 1 wherein the first drying step is said one drying step.

4. A method according to claim 1 wherein the binder is colloidal alumina sol, or colloidal silica sol.

5. A method according to claim 1 wherein the binder is ethyl silicate, sodium silicate or potassium silicate.

6. A method according to claim 1 wherein the binder is a metallic phosphate or borate.

7. A method according to claim 1 wherein the inorganic fibre is selected from alumino silicate fibre, calcium silicate, asbestos, alumina, silica, zirconia, boron nitride, silicon carbide or carbon firbres or a mixture of one or more of these.

8. A method according to claim 7 wherein a proportion of the fibres are metal fibres.

9. A method according to claim 1 wherein the mixture comprises a particulate refractory filler.

10. A method according to claim 1 wherein after the two drying steps the articles are further improved by drying at a temperature between 300° – 900°C for ½ – 24 hours.

11. A method according to claim 1 wherein the ingredients of the mixture and the conditions of the method are selected to give a material of final density 0.30 to 0.9 gm/cm$^3$.

* * * * *